(12) United States Patent
Gadda et al.

(10) Patent No.: US 11,214,704 B2
(45) Date of Patent: Jan. 4, 2022

(54) GLYCOLIC ACID POLYMERS AND METHOD OF PRODUCING THE SAME

(71) Applicant: Teknologian tutkimuskeskus VTT Oy, Espoo (FI)

(72) Inventors: Thomas Gadda, Vtt (FI); Minni Pirttimaa, Vtt (FI); Ali Harlin, Vtt (FI); Mika Harkonen, Vtt (FI)

(73) Assignee: TEKNOLOGIAN TUTKIMUSKESKUS VTT OY, Espoo (FI)

( * ) Notice: Subject to any disclaimer, the term of this patent is extended or adjusted under 35 U.S.C. 154(b) by 0 days.

(21) Appl. No.: 16/707,486

(22) Filed: Dec. 9, 2019

(65) Prior Publication Data

US 2020/0109310 A1    Apr. 9, 2020

Related U.S. Application Data

(63) Continuation of application No. 14/934,840, filed on Nov. 6, 2015, now abandoned, which is a continuation-in-part of application No. PCT/FI2014/050334, filed on May 6, 2014.

(30) Foreign Application Priority Data

May 6, 2013    (FI) .................................. 201354671

(51) Int. Cl.
| | |
|---|---|
| C08G 63/60 | (2006.01) |
| C09D 167/04 | (2006.01) |
| C08G 63/00 | (2006.01) |
| C08G 18/73 | (2006.01) |
| C08G 63/91 | (2006.01) |
| C08G 18/42 | (2006.01) |
| C08G 63/78 | (2006.01) |
| C08G 63/08 | (2006.01) |
| C08G 63/06 | (2006.01) |
| C08G 63/664 | (2006.01) |
| C09D 175/06 | (2006.01) |
| C08J 5/18 | (2006.01) |
| C08K 5/29 | (2006.01) |
| D01F 6/62 | (2006.01) |

(52) U.S. Cl.
CPC ....... *C09D 167/04* (2013.01); *C08G 18/4283* (2013.01); *C08G 18/73* (2013.01); *C08G 63/00* (2013.01); *C08G 63/06* (2013.01); *C08G 63/08* (2013.01); *C08G 63/664* (2013.01); *C08G 63/78* (2013.01); *C08G 63/912* (2013.01); *C08J 5/18* (2013.01); *C09D 175/06* (2013.01); *C08J 2367/04* (2013.01); *C08K 5/29* (2013.01); *D01F 6/625* (2013.01)

(58) Field of Classification Search
CPC ................ C08G 18/10; C08G 18/3221; C08G 18/3203; C08G 63/08; C08G 63/60; C08G 63/912
See application file for complete search history.

(56) References Cited

U.S. PATENT DOCUMENTS

| | | | |
|---|---|---|---|
| 6,087,465 A * | 7/2000 | Seppala ............. | C08G 18/4283 525/450 |
| 2008/0221265 A1* | 9/2008 | Sodergard ............ | C08G 83/005 524/599 |

OTHER PUBLICATIONS

Seppala et al "Degradable Polyesters through Chain Linking for Packaging and Biomedical Applications", Macromol. Biosci. 2004, 4, 208-217, published on Mar. 2004.*

Hiltunen et al "Effect of Catalyst and Polymerization Conditions on the Preparation of Low Molecular Weight Lactic Acid Polymers, Macromolecules 1997, 30, 373-379", published on Apr. 1997.*

* cited by examiner

*Primary Examiner* — Gregory Listvoyb
(74) *Attorney, Agent, or Firm* — McCormick, Paulding & Huber PLLC

(57) ABSTRACT

Described herein is a feasible, significantly simplified production method that avoids challenging lactonization steps and converts a low molecular weight aliphatic polyester, consisting of hydroxy acids and a comonomer, whose molecular weight has been increased by step-growth polymerization reactions. The molecular weight of the aliphatic polyester, based on comparison of initial and final weight average molecular weights ($M_{w,1}/M_{w,2}$), increased significantly at a rate which permits the use of reactive extrusion to produce high molecular weight aliphatic polyesters in a simple, economically feasible manner.

12 Claims, 5 Drawing Sheets

Case 1.

Case 2.

Case 3.

GLYCOLIC ACID POLYMERS AND METHOD OF PRODUCING THE SAME

CROSS-REFERENCE TO RELATED APPLICATIONS

This application is a Continuation of U.S. patent application Ser. No. 14/934,840 filed Nov. 6, 2015, which is a Continuation-In-Part Application of International Patent Application No. PCT/FI2014/050334 filed May 6, 2014, which claims priority to Finnish Patent Application No. 20135467 filed on May 6, 2013, each of which is hereby incorporated by reference in its entirety.

TECHNICAL FIELD

The present invention relates to polyesters. In particular, the present invention concerns the synthesis difunctional aliphatic polyesters, which may exhibit a low molecular weight limiting their use in practise, conversion of such polymers to a higher molecular weight polymeric material and production methods thereof leading to products derived mainly from hydroxy acids, particularly but not exclusively, from glycolic acid.

BACKGROUND ART

Polyglycolic acid, prepared from the smallest member of the α-hydroxy acid family, has been produced and copolymerized by condensation polymerization processes for decades. (cf. U.S. Pat. Nos. 2,676,945, 2,683,136).

A common disadvantage of conventional condensation polymerization is that a polymer exhibiting a low molar mass is typically formed in the process. The low molecular weight prevents the polymer to achieve sufficiently good properties to be useful in a myriad of applications. Similar methods to produce polyglycolic acid are polycondensation of an alkyl glycolate and desalting polycondensation of a glycolic acid salt. Equivalent reactions can be used for lactic acid, albeit with a frequent disadvantage where the desired optical purity of the precursor is lost due to racemization during the polycondensation reactions.

As known by those familiar with the art, higher molecular weight materials with subsequently improved properties can be obtained by ring-opening polymerization of the equivalent lactone or cyclic ester. Improvements to these processes have similarly a long history (GB 825,335, U.S. Pat. No. 3,442,871). However, the preparation of pure glycolide which yields high molecular weight polyglycolic acid is difficult to achieve. For example, preparation of pure glycolide has been described in 1987 (cf. U.S. Pat. No. 4,650, 851). Numerous process improvements have been reported (cf. U.S. Pat. Nos. 5,223,630; 7,235,673). Processes to prepare lactide, a closely related molecule, result in poor collected yields of glycolide and high amounts of undesired side products which make the glycolide forming process a bottleneck for wider use of the material. Thus, preparation of glycolide in high yields requires the use of solvents and additives which must be separated from the product and present a technical obstacle for wider use of the materials.

Aliphatic polyesters, including polyglycolic acid and polylactic acid, are biodegradable materials as these are degraded through hydrolysis and/or through microbial or enzymatic pathways. The biodegradability and biocompatibility make these useful in many applications. Poly(α-hydroxy acid)s have been under research for medical devices as surgical sutures and artificial skins since the 1960s, where one area of interest has been on polyglycolic acid (Vert, M. et. al., *Makromol Chem Suppl* 1981, 5, 30-41). Beyond medical applications polyglycolic acid has been proposed as a barrier material for containers (U.S. Pat. Nos. 4,424,242, 4,565,851). Later in 1988 polyglycolic acid copolymers have been applied also for packaging applications (cf. U.S. Pat. No. 4,729,927).

Utilization of step growth copolymerization with for example diisocyanates is a well-known technology. Such methods have been used for lactic acid based materials (U.S. Pat. No. 5,380,813) with a clear disadvantage as the optically pure precursor undergoes racemization during the condensation process losing its crystallinity, thus severely limiting its applicability due to a low glass transition temperature as the sole thermal transition for the material.

SUMMARY

It is an object of this invention to provide a method to produce a high molecular weight copolymer consisting of polyglycolic acid segments that exhibits properties making it useful in applications including but not limiting to packaging of various articles or fluids, as a barrier material or in medical applications as implantable material or drug delivery vehicle.

A second object of this invention is to provide material compositions consisting of polyglycolic acid segments that are able to form crystalline structures after a step-growth molecular weight extension step.

It is a third objective of this invention to provide methods to prepare a suitable α,ω-difunctional polyglycolic acid polymer prepared by but not limited to a condensation process which can be efficiently utilized in step-growth polymerizations to increase its molecular weight.

A further objective is to provide suitable comonomers for the step-growth polymerization or chain extension of the described polyglycolic acid polymer.

One more object of this invention is to carry out the step-growth copolymerization for molecular weight increase in such a manner that the weight percentage of the polyglycolic acid segments is as high as possible in order to retain its useful properties.

Still a further object is to avoid glycolide as an intermediate for the polymer through preparation of telechelic hydroxy-terminated prepolymers of glycolic acid by a condensation process, and which can be applied by useful methods and process to polymerize hydroxyacid monomers to high molar weight polymers which are processable to applications.

Final object is to use said materials as films, sheets, fibers, powders or molded articles in applications.

These and other objects, which jointly with existing materials and methods are achieved in the present description are described and claimed herein.

The present invention is based on the formation of a polyglycolic acid polymer, or optionally copolymer, which can undergo step-growth reactions to increase its molecular weight. By a subsequent step-growth polymerization step of a polyglycolic acid polymer, or optionally copolymer, high molecular weights can be achieved which are difficult to achieve for polyglycolic acid, particularly by condensation processes as known for those familiar to the art. In particular, significant benefits are achieved when said polyglycolic acid polymer has been prepared by a condensation process thus avoiding the cumbersome synthesis of glycolide and its subsequent ring-opening polymerization.

Particularly preferred compositions of the polyglycolic acid polymer and copolymer include, in addition to glycolic acid:
  one or more organic molecule, linear, branched, cyclic, aromatic or polymeric containing two or more hydroxy, carboxylic acid, thiol or amino groups
  a hydroxy acid comonomer, or its equivalent lactone, of general formula HO(CH$_2$)$_n$CHR(CH$_2$)$_m$COOH wherein
    R is independently selected from a group consisting of hydrogen, linear alkyl, alkenyl alkynyl, branched alkyl, cyclic alkyl and aryl moieties, and
    n and m are integers which can independently vary between 0 and 20

Preferred classes of the chemicals that can be used to increase the molecular weight of the polyglycolic acid polymer and copolymer include: diisocyanates, bisepoxy compounds, dialdehydes, diimines, diketenes, phosphoric acid esters and bisoxazolines. Particularly preferred classes are diisocyanates and bisepoxy compounds.

More specifically, the present (pre)polymers comprise the steps of providing glycolic acid; providing a difunctional monomer; subjecting said glycolic acid to condensation polymerization in the presence of said monomer; and continuing polymerization to provide a polymeric chain formed by residues derived from glycolic acid and said difunctional monomer.

The method according to the present invention for producing (pre)polymers comprise the steps of providing glycolic acid; providing a difunctional monomer; subjecting said glycolic acid to polymerization in the presence of a catalyst and said difunctional monomer; and continuing polymerization to provide a polymeric chain formed by residues derived from glycolic acid and said monomer, and the glycolic acid polymers according to the present invention comprising at least two prepolymers, preferably 5 to 100 prepolymers, linked together.

The method of producing the polymers comprises subjecting a prepolymer to step-growth polymerization in the presence of a chain extender to provide a linear polymer having a molecular weight (Mn) of more than 10,000 g/mol, in particular about 20,000 to 1,000,000 g/mol and the novel uses for forming polymeric films, sheets, fibers, powders or moulded articles, in particular for forming compression-moulded, injection-moulded, blow-moulded products, and other formed or moulded products.

Considerable advantages are obtained by the present invention. The present invention provides for controlled preparation of polyglycolic acid polymers by condensation polymerization in a first step, optionally in combination with an increase in molecular weight in a second step, which preferably is being carried out after the first step. The increase in molecular weight can be achieved using chemicals that extend the polymer chains to longer units yielding high molar mass linear or optionally branched polymers.

These polymers retain melting transitions and hence also find use in higher temperature applications. Thus, various embodiments of the invention are useful for producing polyglycolic acid based materials with high molecular weights.

Lactic acid is optically active, and condensation polymerization typically leads to racemization of the optically pure monomers. As a result, corresponding polymers (PLAs) are not crystalline and their use is limited. The present glycolic acid polymers are not impaired by such features.

The polymers obtained can be used as such or in blends with other polymers in a range of applications.

Next, the invention will be examined more closely with the aid of detailed description with reference to the appended drawings.

DETAILED DESCRIPTION

Figure 1:
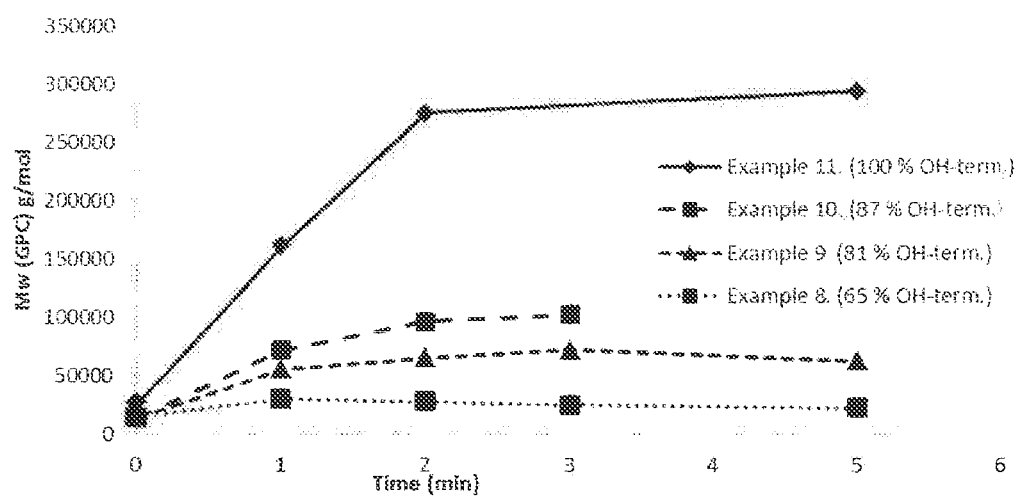
FIG. 1 shows the molecular weight increase of polymers with varying degree of hydroxyl-termination based on Examples 8, 9, 10, 11 and 12.

Described herein is a feasible, significantly simplified production method that avoids challenging lactonization steps and converts a low molecular weight aliphatic polyester, consisting of hydroxy acids and a comonomer, whose molecular weight has been increased by step-growth polymerization reactions. providing glycolic acid;

The method comprises providing a difunctional monomer; subjecting said glycolic acid to condensation polymerization in the presence of the monomer and preferably a catalyst; and continuing polymerization to provide a polymeric chain formed by residues derived from glycolic acid and said difunctional monomer. Preferably, in particular when carrying our condensation polymerization in the presence of an esterification catalyst, water formed during condensation polymerization is continuously removed.

The molecular weight of the aliphatic polyester, based on comparison of initial and final weight average molecular weights ($M_{w,1}/M_{w,2}$), increased significantly at a rate which permits the use of reactive extrusion to produce high molecular weight aliphatic polyesters in a simple, economically feasible manner.

In one embodiment, the present technology provides for telechelic polymers of glycolic acid. The term "telechelic" is used for indicating that the present polymers or prepolymers are capable of being subjected to polymerization through their reactive end-groups. The end groups typically exhibit the same (chemical) functionality.

In a preferred embodiment, the polymers of the present kind are capable of being used as prepolymers.

Typically the present polymers comprise at least 5, for example 5 to 250, preferably 6 to 100, in particular 10 to 50 residues of glycolic acid.

The polymers comprise in one preferred embodiments essentially linear polymeric chains. In another preferred embodiment, the prepolymers comprise a branched polymeric chain.

As will be discussed in more detail below, in a preferred embodiment, the present polymers have a degree of crystallinity of at least 30%, preferably at least 40%, in particular at least 50% of the crystallinity or melting enthalpy of the prepolymer.

Further, the present polymers comprise typically at least 80 mol-%, preferably at least 90 mol-%, of residues derived from glycolic acid.

To reach the aim of providing a telechelic polymer, the polymer according to the present technology suitably comprises 0.1 to 20 mol-%, preferably 0.5 to 10 mol-%, more preferably 1 to 5 mol-%, of residues derived from a suitably terminated, e.g. a difunctional, comonomer, typically a hydroxy-terminated comonomer.

In a particularly interesting embodiment, the molar ratio between residues derived from glycolic acid and residues derived from a comonomer is 1000:1 or less, for example 500:1 or less, suitably 300:1 or less, advantageously 45:1 to 55:1, in particular 48:1 to 52:1.

In one embodiment, the comonomers are selected exclusively from comonomers which are hydroxy-terminated comonomers (diols, triols, tetraols, pentaols), such as propanediol, butanediol, hexanediol, pentaerythriol and oligomeric polyethylene glycol and combinations thereof, to produce a hydroxy-terminated telechelic polymer.

In another embodiment, at least a part of the comonomers (optionally in combination with any of the above, in particular diols) is selected from the group of dicarboxylic acid, dithiol, and diamine and mixtures thereof.

Formula I shows an example of a telechelic, hydroxyl-terminated glycolic acid polymer of the instant kind. In the formula m and n are integers which stand for a value of 1 to 100.

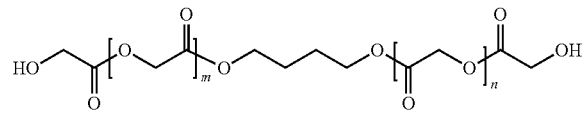

Various features of the synthesis of the polyhydroxy acid polymers according to the present technology will be examined in the following.

It has been found that polyhydroxy acid polymers, in particular prepolymers of a kind consisting to a high degree of polyglycolic acid, are suitable for a subsequent step growth polymerization process which extends the molecular weight of the resultant material to levels which are required for its acceptable use in applications.

The polyhydroxy acid polymer can be obtained as a product of condensation polymerization of glycolic acid, optionally one or more hydroxy acid, or the corresponding lactone, as a comonomer, and one or more suitable α,ω-difunctional compound.

In one embodiment, the step of preparing a hydroxyl-terminated telechelic polymer of glycolic acid, comprises the steps of
  providing glycolic acid;
  providing a hydroxy-terminated monomer;
  subjecting the glycolic acid to condensation polymerization in the presence of an esterification catalyst and the hydroxy-terminated monomer;
  continuously removing water formed during condensation polymerization; and
  continuing polymerization to provide a polymeric chain formed by residues derived from glycolic acid and the hydroxy-terminated monomer.

The esterification catalyst can be an organic or inorganic compound. The catalyst can be an organic or inorganic acid. The catalyst can also be a metal compound of tin, zinc, lead, titanium, antimony, cerium, germanium, cobalt, manganese, iron, aluminum, magnesium, calcium and strontium. For example, metal alkoxides, organic acid salts of metal, chelates and metal oxides can be used. Particularly useful catalysts are organic zinc, tin and titanium compounds, such as zinc, tin or titanium octoate, and alkylester titanate, titanium oxy acetyl acetonate, and titanium oxalate.

The amount of the catalyst is preferably from 0.001 to 0.5% by weight of the glycolic acid together with the comomoners.

According to one preferred embodiment, the content of the glycolic acid in the polyhydroxy acid polymer is so high that the condensated segments of the glycolic acid repeating units are able to form crystals in the polyhydroxy acid polymer and in the subsequent polymer formed after a step growth polymerization process. Hence, it is preferred that the glycolic acid weight ratio to the total weight of monomers is, at the start of the polymerization, at least more than 50%, preferably more than 70% and most preferably more than 90%.

Another hydroxy acid, or the corresponding lactone thereof, may be used in a preferred composition as a comonomer to adjust the properties of the polyhydroxy acid polymer. Such hydroxy acids have the general formula $$HO(CH_2)_n CHR(CH_2)_m COOH$$

wherein
  R is independently selected from a group consisting of hydrogen, linear alkyl, linear alkenyl linear alkynyl, branched alkyl, cyclic alkyl, cyclic alkenyl, aromatic (consisting of 1-6 rings) and alkylaromatic (consisting of 1-6 rings) moieties; and
  n and m are integers which can vary between 0 and 20.

Examples of hydroxy acid comonomers include lactic acid, 3-hydroxypropionic acid, 2-hydroxybutanoic acid, 3-hydroxybutanoic acid, 4-hydroxybutanoic acid, 5-hydroxypentanoic acid, 6-hydroxyhexanoic acid, and benzoic acid.

According to another preferred embodiment of the invention the weight ratio of added hydroxy acid comonomers is less than 30%, more preferably less than 20% and most preferable less than 10%.

Suitable α,ω-difunctional compounds are used to generate polyhydroxy acid compositions which in turn yield and a suitable α,ω-difunctional polyhydroxy acid materials. The ability to form α,ω-difunctional polyhydroxy acid materials is critical to achieve successful increase in molecular weight in the subsequent step growth polymerization step. In the examples below it is demonstrated that having a high degree of α,ω-difunctionality in the polyhydroxy acid materials has a direct impact on the success of the step growth polymerization step.

The properties and molecular weight of α,ω-difunctional polyhydroxy acid material can be adjusted based on the ratio of the hydroxy acid and the α,ω-difunctional compound. The amount of the α,ω-difunctional compound will directly impact on the resultant molecular weight of the material. An increased use of α,ω-difunctional compounds results in a decreased molecular weight of the resultant α,ω-difunctional polyhydroxy acid material. Also, the properties of α,ω-difunctional compound will have an impact on the resultant α,ω-difunctional polyhydroxy material. For instance, the use of a polymeric α,ω-terminated material in the condensation process will yield a copolymer with unique properties. According to a further preferred embodiment of the invention, the content of the added α,ω-difunctional compounds is less than 20%, preferably less than 15% and most preferably less than 10%.

As noted above, such an organic added α,ω-difunctional compound may be linear, branched, cyclic, aromatic or polymeric containing hydroxy, carboxylic acid, thio or amino groups. Examples of such compounds are diols, dicarboxylic acids and their anhydrides, diamines and polymeric materials having α,ω-difunctionality, wherein the functionality is a dihydroxy, diacid, dithio or diamines.

Examples of such classes of compounds are ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,2-propanediol, 1,2-butanediol, 2,3-butanediol, 1,3-butanediol, 1,2-pentanediol, neopentyl glycol, equivalent thiols, oxalic acid, malonic acid, maleic acid, maleic anhydride itaconic acid, succinic acid, succinic anhydride, glutaric acid, adipic acid, pimelic acid, suberic acid, azelaic acid, sebacic acid, ethylene diamine, 1,3-propylene diamine, 1,4-butane diamine, 1,5-pentanediamine, 1,6-hexanediamine, telechelic polyethylene glycol, telechelic polypropylene glycol, polytetramethyl ethylene glycol. These examples are not exclusive and can be complemented with related compounds, linear or branched as well as cyclic or aromatic and derivatives thereof.

In a further preferred embodiment, the present invention also permits the preparation of ω-multiterminated polyhydroxy acids. Such materials are obtained when the α,ω-difunctional compounds is replaced by an equivalent having three or more similar, or dissimilar functionalities permit the preparation of ω-multiterminated polyhydroxy acids which under step growth conditions yield thermosetting materials as known for those familiar to the art. Particularly preferred are compounds having three or more similar functionalities. Unambiguous examples of such compounds are glycerol, pentaerytritol, trimethylol propane and the like.

One further embodiment of this invention is the production process how to obtain α,ω-difunctional polyhydroxy acid materials. Polyglycolic acid as a homopolymer has a melting transition above 210-220° C., which necessitates high reaction temperatures if one wants to conduct the polymerization process in a molten state.

Basically, this may require that the reaction media be heated to 230-250° C., which under prolonged times lead to darkening of the material, in particular if oxygen is present. A discoloured product is of disadvantage in consumer applications when optically attractive materials are preferred and hence yellowish or even brown-like materials are unfavourable.

It has surprisingly been found that the melt condensation polymerisation of glycolic acid can be performed at temperatures below the melting point of the product polyglycolic acid (which is typically 210-220° C., as mentioned above). The polycondensation temperature is gradually increased and the absolute pressure decreased during the typical melt polycondensation stage.

It is beneficial to avoid too high polymerisation temperatures that easily generate unwanted brown colour for the polymer.

Thus, according to a preferred embodiment of the present technology α,ω-difunctional polyhydroxy acid materials can be obtained by a process where the condensation polymerization is carried out sequentially first in the molten state and then followed by a condensation process that takes place in a solid state at 200° C. or less for a prolonged period of time. The use of lower polymerization temperatures in the solid-state polymerization does not substantially affect the colour of the material. Prolonged polymerization times at high temperatures will cause undesired yellowing or darkening of the product. The solid state polymerization may optionally be followed by a final step at 240° C. or higher for a shortest possible time to obtain a freely flowing product that can be easily handled and transferred. Reduced pressure is beneficial for the progress of the condensation polymerisation during all the steps, and in the later stages of polymerisation high vacuum can be applied (below 50 mbar absolute pressure). A preferred time for the first melt polymerization is 36 h or less and 24 h or less for the solid polymerization prior to the final dehydration, and condensation process. A further method to increase the content of the α,ω-difunctional polyhydroxy acid materials is to increase the content of the α,ω-difunctional comonomer in the feed, which increases the probability of obtaining a α,ω-difunctional polyhydroxy acid material.

In a particularly preferred embodiment, the polymerisation temperatures at the end of the melt stage polycondensation are 180-220° C., preferably 190-210° C. Typically, operation at these temperature ranges is possible after 6 to 10 h from the beginning of the polycondensation stage.

The instant embodiment also makes it possible to produce the telechelic prepolymer with high enough molecular weight and uniform enough end group functionalization without solid state polymerisation stage.

Another method to produce the α,ω-difunctional polyhydroxy acid materials, as known for those familiar to the art, is the process in a solvent where the said solvent is capable of dissolving the polymer that is formed and simultaneously assist in removal of the condensation product by azeotropic distillation or the like. Examples of such solvents are dimethylformamide, dimethylacetamide, diphenyl ether and dimethylsulphoxide.

In the above discussed embodiments, the monomers and the difunctional compound can be added simultaneously or sequentially. In one embodiment, glycolic acid monomers are first subjected to condensation polymerization, optionally together with comonomers, to provide oligomers (comprising 2 to 8 units) and only then difunctional compound is added. In another embodiment, glycolic acid is first condensation polymerized, the comonomer is added, and polymerization is continued. Finally difunctional compound is added and polymerization is continued. In a third embodiment, glycolic acid monomers are first condensation polymerized, then difunctional compound is added and polymerization is continued. Finally, comonomer is added and polymerization is continued.

In one more embodiment the temperature for the melt polymerization can be adjusted by the amount of α,ω-difunctional comonomer. Typically, increased concentrations of the α,ω-difunctional comonomer result in a decreased melting temperature for the α,ω-difunctional polyhydroxy acid material, which permit the use of decreased polymerization times and hence may impart in the desired appearance of the product.

Molecular Weight Increase of the Polyhydroxy Acid by Step Growth Polymerization

In studies it has been found that the degree of α,ω-difunctionality should be considered when the outcome of the step growth polymerization is evaluated. For successful use in application, it has been determined that the weight average molecular weight ($M_w$) of the material should exceed 50,000 g/mol as determined by SEC. If the Mw is lower than this, the material is unable to form continuous articles, such as thin films, which are useful in packaging applications. This can be easily tested as solvent castings from HFIP by monitoring whether continuous films can be achieved or if the film forms cracks during drying. Based on this it has been concluded that the Mw should at minimum double its value during the step growth polymerization.

Figure 4:
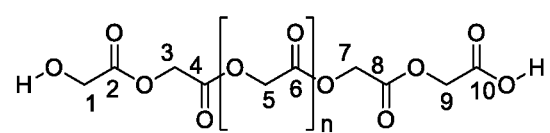
FIG. 4 shows three plausible polymer structures for a polymer prepared by condensation polymerization of glycolic acid and a difunctional comonomer (e.g. hexanediol): Case 1-OH/COOH-terminated polymer chain, Case 2-α,ω-OH-terminated polymer chain, and Case 3-macrocyclic polymer chain with no terminating group(s)
Figure 4:
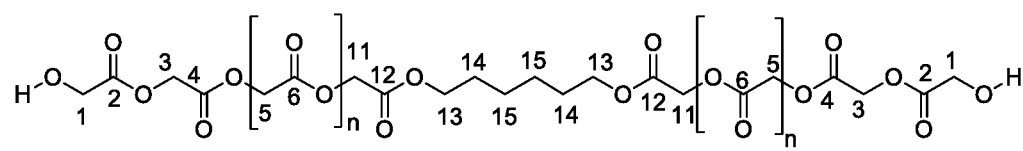
Figure 4:
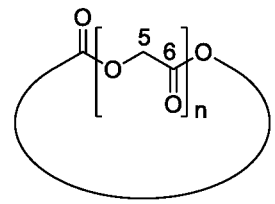

In the production of the present α,ω-difunctional polyhydroxy acid materials, three types of materials can theoretically be obtained. This is depicted in FIG. 4 as a result of a condensation polymerization of glycolic acid and 1,6-hexanediol. If the α,ω-difunctional compound is present in the polymer molecule, an α,ω-difunctional polyhydroxy acid material is obtained. However, if an α,ω-difunctional is not included in all polymer molecules, a material exhibiting both carboxylic acid and hydroxy functions are present in addition to the α,ω-difunctional polyhydroxy acid material. As the third possible structure is a macrocycle which is formed when the carboxylic acid and hydroxy functions of a polymer molecule intramolecularly react.

As known for those familiar to the art, either carboxylic or hydroxy functions can react with noted comonomers used for the step-growth molecular weight increase step. In some cases a comonomer may be able to react with both carboxylic and hydroxy functions. For instance, the reaction with a hydroxy group and an isocyanate yields a carbamate, or urethane, structure while the reaction with a carboxylic acid and an isocyanate yields an amide structure with carbon dioxide as a by-product. However, as can be seen from FIG. 1, the OH/COOH ratio of terminal groups, or the degree of α,ω-difunctionality, has a profound impact on the result of the step growth polymerization. Hence to achieve a sufficient molecular weight increase, in one further embodiment of this invention the degree of the α,ω-difunctionality is more than 60%, preferably more than 70% and most preferably more than 80%, when the degree of α,ω-difunctionality is determined from a quantitative $^{13}$C NMR spectra.

Figure 5:
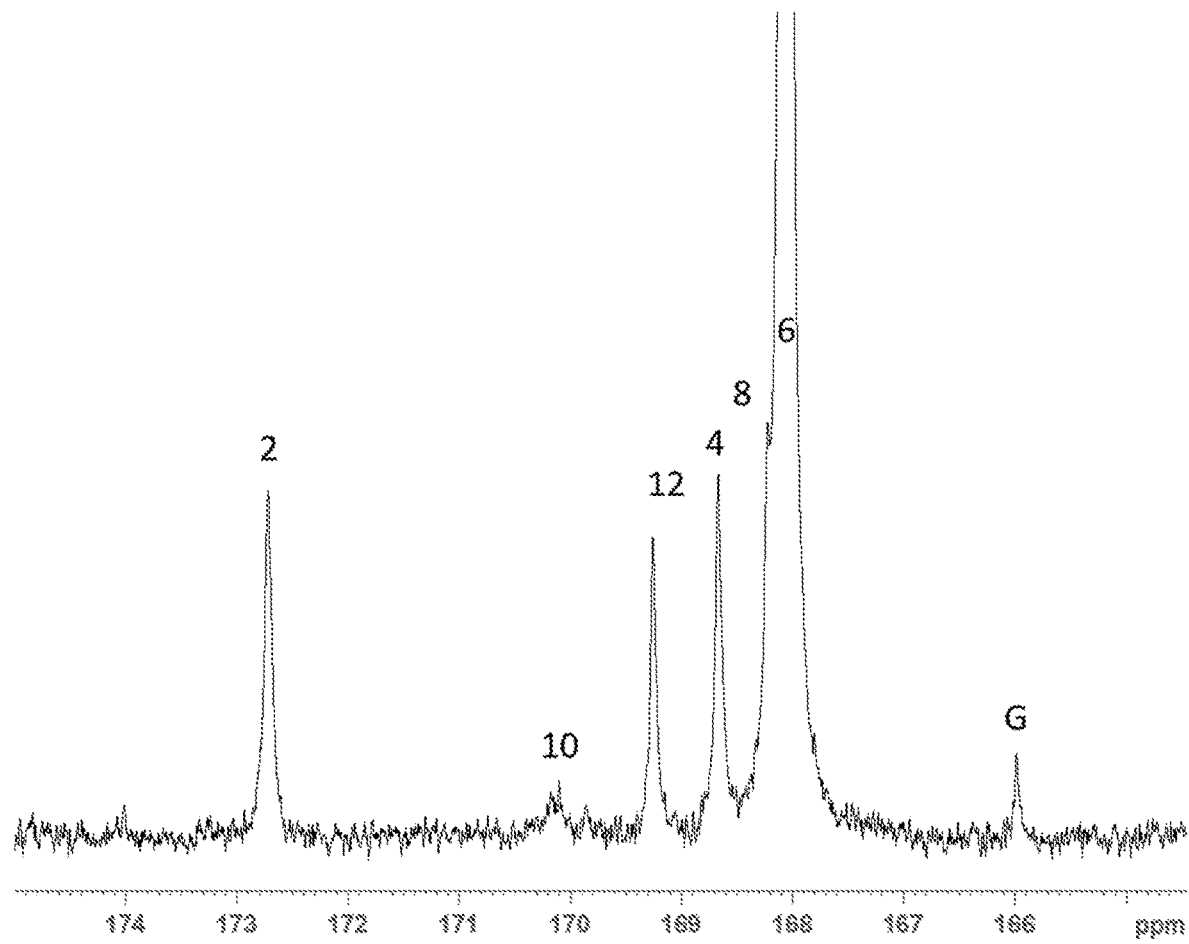
FIG. 5 is a quantitative 13C NMR spectrum of a polyhydroxy acid polymer from range of 174-165 ppm.
Figure 6:
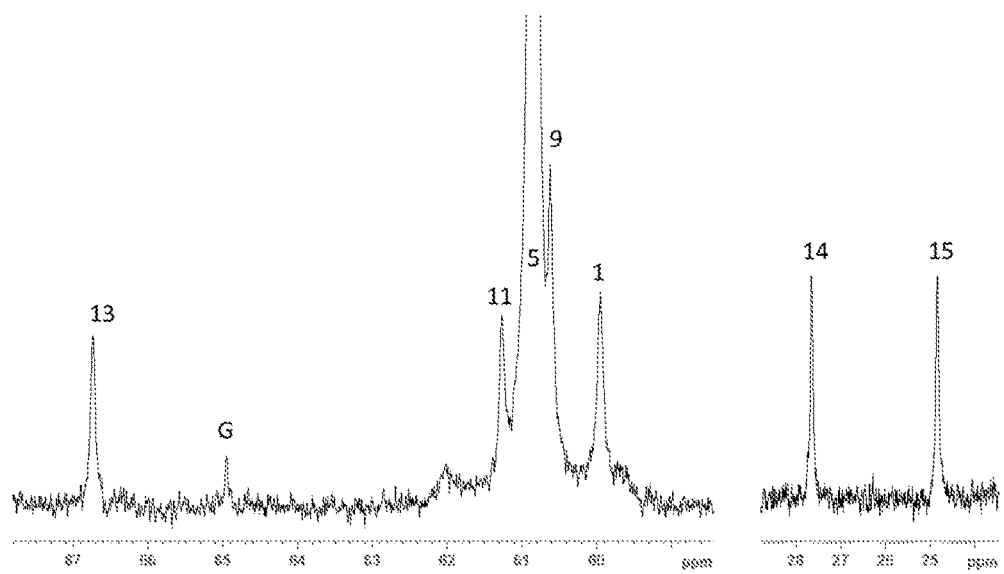
FIG. 6 is a quantitative 13C NMR spectrum of a polyhydroxy acid polymer from range of 67-59 ppm and 25-24 ppm.

The difunctionality is calculated from the ratios of OH and COOH terminal polymer chain as follows based on three plausible polymer structures that can be formed in the condensation polymerization process of a copolymer of an exemplary diol, 1,6-hexanediol, and glycolic acid (cases 1 to 3). Assignations of the signals from spectra are presented in FIGS. 5 and 6. Signals from glycolide are assigned as G.

In the first case there is no hexanediol in the polymer chain and therefore it is OH/COOH-terminated. A COOH-terminated end group gives characteristic peaks at ~170.2 ppm and ~60.7 ppm (carbons 10 and 9). Other assigned signals are the repeating unit at ~168.0 and ~60.9 ppm (carbons 5 and 6) OH-end group at ~172.8 ppm and ~59.9 ppm (carbons 1 and 2), and the glycolic acid unit next to the end-group at 168.7 and other signal possibly overlapping with repeating unit (carbons 3 and 4).

In the second case there is one hexanediol unit most likely in the middle of the chain. Hexanediol unit gives characteristic signals at ~66.8 ppm, ~27.7 and ~24.8 ppm (carbons 13, 14 and 15), and the glycolic acid monomers next to hexanediol unit give signals at ~169.3 and ~61.3 ppm (carbons 11 and 12).

In the third case it is assumed that the repeating unit is the same in the whole cyclic structure and therefore it gives one signal in carbonyl region and one signal in aliphatic region. The signals are most likely fused into the signals of the repeating units at ~168.0 and ~59.8 ppm (carbons 5 and 6), and therefore it might increase the value of calculated number average molecular weight (Mn).

Number average molecular masses were calculated from integrals obtained from spectra as follows:

$$M_n = \frac{\sum nM_n}{\sum n} = \frac{n_{OH/OH}M_{OH/OH} + n_{OH/COOH}M_{OH/COOH}}{n_{OH/OH} + n_{OH/COOH}} \quad (1)$$

$$n_{OH/OH} = A_{21\,ppm} = 1 \quad (2)$$

$$n_{OH/COOH} = A_{170,1\,ppm} \quad (3)$$

$$M_{n,OH/OH} = \left(\frac{A_{RU}}{\sum n} + 4\right)M_{RU} + M_{diol} \quad (4)$$

$$M_{n,OH/COOH} = \left(\frac{A_{RU}}{\sum n} + 3\right)M_{RU} \quad (5)$$

As noted above, preferred classes of the chemicals that can be used to increase the molecular weight of the polyglycolic acid polymer and copolymer in a step growth polymerization process include: diisocyanates, bisepoxy compounds, dialdehydes, diketenes, phosphoric acid derivatives and bisoxazolines.

Examples of these are alkyl diisocyanates, such as butane diisocyanate, hexamethylene diisocyanate, aromatic isocyanates such as tolylene-2,4-di-isocyanate, tolylene-2,5-diisocyanate, tolylene-2,6-diisocyanate, 1,4-phenylene diisocyanate, 1,3-phenylene diisocyanate, m-xylylene diisocyanate, poly(hexamethylene diisocyanate.

Examples of bis-epoxy function compounds are aliphatic, aromatic and polymeric diglycidyl ethers, such as ethylene glycol diglycidyl ether, propylene glycol diglycidyl ether, neopentyl glycol diglycidyl ether, bisphenol A diglycidyl ether, and polyethylene glycol diglycidyl ether.

Examples of phosphoric acid esters are trimethylphosphate, triphenylphosphate fatty acid phosphates (e.g. stearyl phosphates), and 2,6-di-tert-butyl-4-methylphenyl phosphite.

Figure 7:
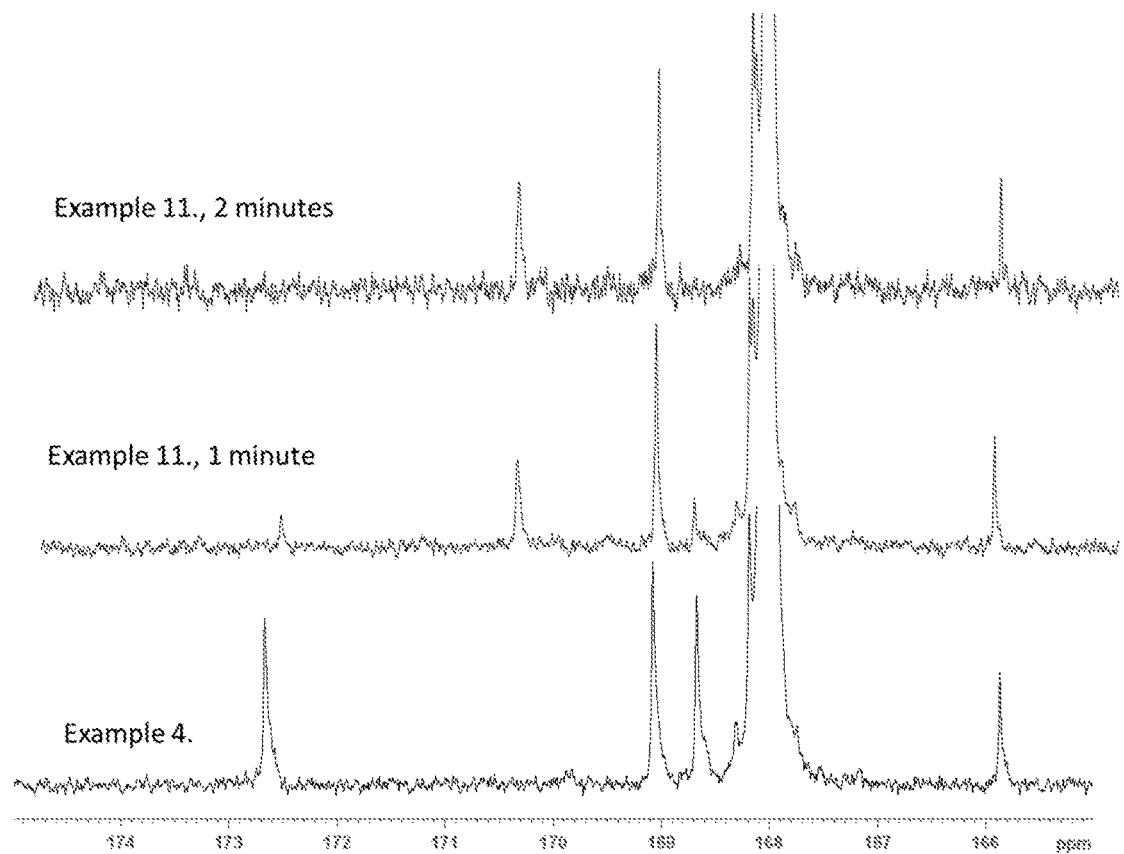
FIG. 7 is an NMR showing completion of the step growth polymerization reaction in 2 minutes.

According to present invention the compounds used in the step growth polymerization step are chosen in such a way that the molecular weight increase step can be carried out in a twin screw extruder. Analysis has shown that appropriate manufacturing of α,ω-difunctional polyhydroxy acid material combined with step growth polymerization comonomer results in rapid completion of the reaction under conditions of twin screw extrusion (FIG. 7). Hence in an embodiment of the present technology the step growth polymerization step can be completed in less than 30 minutes, preferably less than 10 minutes and most preferably in less than 5 minutes.

As will be discussed below (cf. Example 19), glycolic acid polymers, for example produced by a method according to the present invention, exhibit properties of elongation in combination with high modulus (i.e. high strength properties). Such materials are particularly useful in biaxial orientation or thermoforming applications because they will yield layers that are not prone to having discontinuities. Such polymers typically exhibit a molecular ratio between the prepolymer and the coupling agent, e.g. a diisocyanate, amounting to 1:0.9 to 1:1.3, in particular 1:1 to 1:1.1.

The obtained telechelic material from the condensation process can be fed into the extruder by appropriate hoppers as known for those familiar to the art. It is preferable that the hopper has a moisture free atmosphere in order to prevent undesired hydrolysis to take place. The telechelic prepolymers can be grinded or prepared with suitable equipment to a grain size that can be easily handled by the hopper feed mechanism. The extruder configuration will preferably be such that it consists of four or more segments. The first segment is set up by screw configuration and temperatures so that the telechelic prepolymer melts. The second segment consists of an inlet for addition of the comonomer used for the step-growth polymerization, temperatures that permit to keep the material flowing in the segment and a screw configuration suitable for efficient mixing of the telechelic polymer and the step-growth prepolymers. The third segment consists of an inlet for addition of suitable additives for stabilizing additives, temperatures that permit to keep the material flowing in the segment and a screw configuration suitable for efficient mixing of the formed copolymer. An exhaust to remove potentially gaseous products also can be included in the third segment, or in a separate segment. Other segments may be added according to need if more additions or exhausts are required. The final segment consists of a screw configuration that will permit the material to efficiently exit the extruder die. The preferred temperatures for the segments used in the step growth polymerization in an extruder are 215-280° C., more preferably 220-250° C. or most preferable 220-240° C.

For convenient addition of the comonomer used in the step-growth polymerization of the telechelic prepolymers, it is preferred that such comonomers are in liquid form so they can be added to the extruder by pumps. Hence, comonomers that are solids at room temperature can be dissolved in suitable solvents which do not interfere with the step-growth polymerization reaction and can be easily evaporated in the third segment of the step-growth process. Suitable solvents are polar or apolar solvents such as THF, DMSO, alkanes, toluene, dichloromethane. Protic solvents such as alcohols are not preferred.

For those familiar to the art, the amount and type of the comonomer used for the step growth polymerization will have a profound impact on the product properties. For instance, when using diisocyanates as comonomers, the obtained material may lack sufficient properties if too little of the diisocyanate is used. Similarly, the obtained material may be crosslinked if an extensive amount of the diisocyanate comonomer is used. While theories of step-growth polymerization teach that optimal amount of the reactive comonomers is in an equimolar amount, it may be beneficial to deviate from this according to need. For instance a slight excess of diisocyanate may yield a polymer which possesses long-chain branching in a suitable amount that can have a beneficial effect on the melt viscosity and processability of the polymer.

Further to retain the useful properties of polyglycolic acid, it is important to choose the comonomers in such a way that crystallinity is preserved in the material. Under conditions described herein, such materials are formed.

For the sake of completeness it should be noted out that it is also possible carry out the step growth polymerization step with prepolymers obtained by ring opening polymerization of corresponding lactones (glycolides), although the present condensation polymerization of monomers is preferred.

Various other materials or additives can be mixed into the material during or after the step-growth polymerization process. Such materials may be polymers to yield blends, fillers and reinforcing fibres such as silica or $CaCO_3$, plasticizers, stabilizers against light, thermally or hydrolytically induced degradation, glass fibres or lignocellulosic fibres.

The polymer produced can be formed using known processing methods for thermoplastic or solution formable polymers. Examples are extrusion to films, sheets, profiles, pipes or fibres; solvent casting or fibre spinning from solution. Moulded articles can be produced e.g. by injection moulding, blow moulding or thermoforming. The polymer can be applied as single layer material or as laminates or multi-layer structures.

It should finally be pointed out that although bulk polymerization is described below in more detail, it is also possible to carry out the polymerization steps as solution polymerization and emulsion polymerization.

EXAMPLES

Characterization of Materials

Molecular weights and molecular weight distributions were determined with size exclusion chromatography (SEC). A Waters system equipped with two 7.8 mm×300 mm Styragel HR 4E and HR 5E columns and Waters 2414 Refractive Index Detector connected in series was used. Hexafluoroisopropanol (HFIP, 5 mM $CF_3COONa$) was used as an eluent and was delivered at a rate of 1.0 ml/min. The results were calculated against monodisperse polymethylmethacrylate standards.

Differential scanning calorimetry (DSC) was used to determine thermal transitions of the prepared polymers using Mettler Toledo DSC820 STARe SW 9.20 instrument under nitrogen atmosphere. Samples were heated twice from 0 to 250° C. at a rate of 10° C./min. Thermal transitions were recorded from the second heating scan.

The microstructure of polymers was analysed by $^1$H NMR and $^{13}$C NMR using a Bruker 500 MHz spectrometer. Samples were dissolved in a 2:1 mixture of hexafluoroisopropanol and deuterated chloroform ($CDCl_3$). $^{13}$C NMR were acquired using broad band proton decoupling and relaxation delay of 3 s. Chromium (III) acetylacetonate was added as a relaxation reagent. Chemical shift scale was calibrated to TMS.

The oxygen barrier properties of prepared materials were evaluated by solution coating on Performa White board (Stora Enso). Coatings of polymer solutions (5 wt-%) in hexafluoroisopropanol was performed using an Erichsen bar coater (30 µm bar) theoretically yielding a film thickness of 1.5 µm. To ensure solvent free coatings, the coated boards were dried in ambient conditions for 30 min and subsequently in a circulating air oven at 100° C. for 15 min. The oxygen transmission rate (OTR) was measured from two or more parallel samples using humid gases at room temperature (23° C., 50% relative humidity) with Systech M8001 and expressed as $cm^3/m^2$ day.

Example 1

500 g solid glycolic acid, 15.6 g hexanediol (2 mol-%) and 0.26 g $SnOct_2$ (0.05 m-%) were added to a 1000 mL flask connected to a rotavapor and an oil bath. Temperature was increased gradually from 130° C. to 190° C. and pressure was decreased gradually from 500 mbar to 30 mbar during four hours. When target temperature and pressure were achieved, reaction was continued for 24 hours. Temperature was increased to 230° C. and reaction was continued for two hours. Yield 392 g, $M_n$ (NMR) 2 000 g/mol, $M_n$ (GPC) 10 800 g/mol, $M_w$ (GPC) 15 000 g/mol, $T_g$ 24° C., $T_c$ 90° C., $\Delta H_c$ 15 J/g, $T_m$ 209° C., $\Delta H_m$-99 J/g, 65% OH-terminated.

Example 2

500 g solid glycolic acid, 23.3 g hexanediol (3 mol-%) and 0.26 g $SnOct_2$ (0.05 m-%) were added to a 1000 mL flask and reaction was performed similarly as in example 1. Yield 403 g, $M_n$ (NMR) 1 500 g/mol, $M_n$ (GPC) 10 000 g/mol, $M_w$ (GPC) 14 400 g/mol, $T_g$ 19° C., $T_c$ 95° C., $\Delta H_c$ 51 J/g, $T_m$ 203° C., $\Delta H_m$-95 J/g, 81% OH-terminated.

Example 3

500 g solid glycolic acid, 31.2 g hexanediol (4 mol-%) and 0.27 g $SnOct_2$ (0.05 m-%) were added to a 1000 mL flask and reaction was performed similarly as in example 1. Yield 410 g, $M_n$ (NMR) 1 300 g/mol, $M_n$ (GPC) 10 300 g/mol, $M_w$ (GPC) 14 400 g/mol, $T_g$ 14° C., $T_c$ 88° C., $\Delta H_c$ 47 J/g, $T_m$ 196° C., $\Delta H_m$-97 J/g, 87% OH-terminated.

Example 4

70% glycolic acid solution with high purity was distilled at 100° C. and 200 mbar to remove the water prior usage. 1732 g (22.3 mol) distilled glycolic acid solution, 41 g (2 mol-%) $BuOH_2$ and 0.89 g (0.05 m-%) $SnOct_2$ were added to a 2 L flask and reaction was carried out similarly as presented in example 3. 1397.9 g white polymer was obtained. Polymer was grinded using standard Wiley mill with 2 mm sieve. Grinded PGA was added to a 250 ml flask and the flask was connected to a rotavapor supplied with argon flow. PGA was kept 24 h at 190° C. Temperature was increased to 230° C. during 1 h and PGA was kept at 230° C. for 5 hours. Yield 524 g, $M_n$ (NMR) 3 800 g/mol, $M_n$ (GPC) 14 700 g/mol, $M_w$ (GPC) 26 900 g/mol, $T_g$ 36° C., $T_c$-, $\Delta H_c$-, $T_m$ 212° C., $\Delta H_m$-87 J/g, 100% OH-terminated.

Example 5

500 g solid glycolic acid, 13.2 g succinic anhydride (2 mol-%) and 0.26 g $SnOct_2$ (0.05 m-%) were added to a 1000 mL flask and reaction was performed similarly as in example 1. Yield 387 g, $M_n$ (NMR) 1 300 g/mol, $M_n$ (GPC) 10 400 g/mol, $M_w$ (GPC) 14 200 g/mol, $T_g$ 33° C., $T_c$ 103° C., $\Delta H_c$ 42 J/g, $T_m$ 210° C., $\Delta H_m$-98 J/g.

Example 6

500 g solid glycolic acid, 27.6 g PEG ($M_w$ ~210 g/mol, 2 mol-%) and 0.26 g $SnOct_2$ (0.05 m-%) were added to a 1000 mL flask and reaction was performed similarly as in example 1. Yield 347 g, $M_n$ (NMR) 1 800 g/mol, $M_n$ (GPC) 13 100 g/mol, $M_w$ (GPC) 13 400 g/mol, $T_g$ 24° C., $T_c$ 91° C., $\Delta H_c$ 36 J/g, $T_m$ 208° C., $\Delta H_m$-98 J/g.

Example 7

500 g solid glycolic acid, 17.9 g pentaerytritol (2 mol-%) and 0.26 g $SnOct_2$ (0.05 m-%) were added to a 1000 mL flask and reaction was performed similarly as in example 1. Yield 390 g, $M_n$ (NMR) 1 500 g/mol, $M_n$ (GPC) 13 900 g/mol, $M_w$ (GPC) 16 000 g/mol, $T_g$ 32° C., $T_c$-, $\Delta H_c$-, $T_m$ 190° C., $\Delta H_m$-21 J/g.

Example 8

55 g of prepolymer prepared in Example 1 and equivalent amount of hexamethylene di-isocyanate (HMDI) were added to a Brabender melt mixing equipment. Samples were taken at 1, 2, 3 and 5 minutes. Results are presented in FIG. 1. A solution coated film on Performa White board displayed an OTR of 4600 $cm^3/m^2$ day.

Example 9

55 g of prepolymer prepared in Example 2 and an equivalent amount of hexamethylene di-isocyanate (HMDI) were added to a Brabender melt mixing equipment. Samples were taken at 1, 2, 3 and 5 minutes. Results are presented in FIG. 1. A solution coated film on Performa White board displayed an OTR of 34 $cm^3/m^2$ day.

Example 10

55 g of prepolymer prepared in Example 3. and an equivalent amount of hexamethylene di-isocyanate (HMDI) were added to a Brabender melt mixing equipment. Samples were taken at 1, 2, 3 and 5 minutes. Sample taken at 5 minutes was crosslinked an insoluble. Results are presented in FIG. 1. A solution coated film on Performa White board displayed an OTR of 365 $cm^3/m^2$ day.

Example 11

55 g of prepolymer prepared in Example 4 and an equivalent amount of hexamethylene di-isocyanate (HMDI) were added to a Brabender melt mixing equipment. Samples were taken at 1, 2 and 5 minutes. Results are presented in FIG. 1. Thermal properties of starting material: $T_g$ 36° C., $T_c$-, $\Delta H_c$-, $T_m$ 212° C., $\Delta H_m$-87 J/g. Thermal properties after 1 minute: $T_g$ 36° C., $T_c$ 126° C., $\Delta H_c$ 24 J/g, $T_m$ 204° C., $\Delta H_m$-52 J/g. Thermal properties after 2 minutes: $T_g$ 36° C., $T_c$ 123° C., $\Delta H_c$ 29 J/g, $T_m$ 205° C., $\Delta H_m$-52 J/g. Thermal properties after 5 minutes: $T_g$ 36° C., $T_c$ 118° C., $\Delta H_c$ 26 J/g, $T_m$ 206° C., $\Delta H_m$-55 J/g.

Example 12

Figure 2:
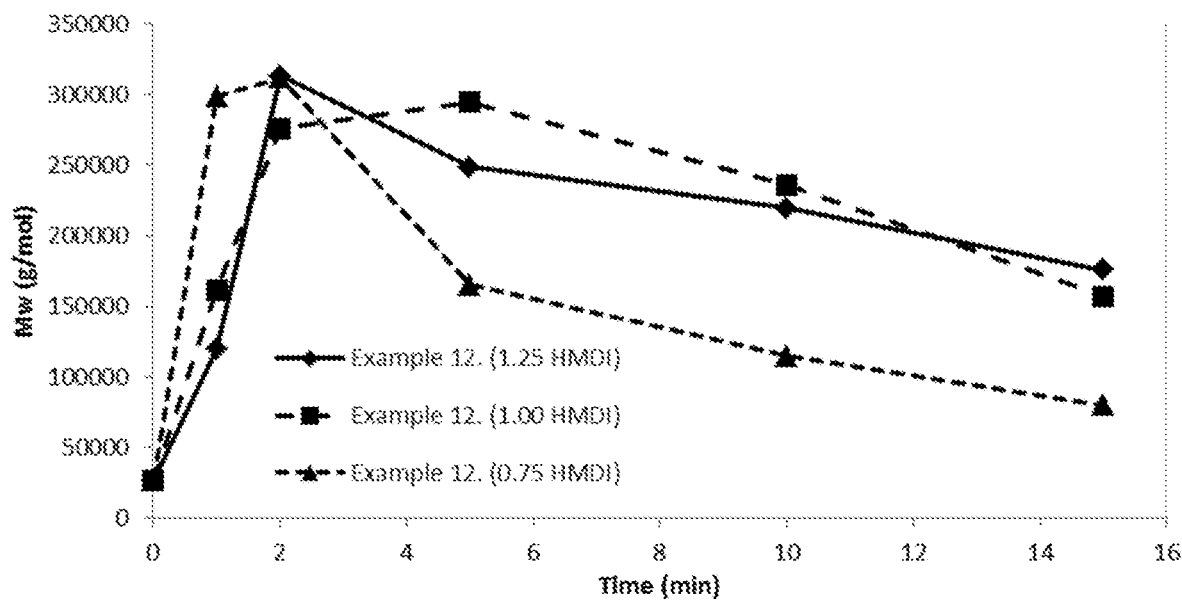
FIG. 2 shows the effect of the amount of chain extender used as in Example 12.

55 of prepolymer prepared in Example 1 and hexamethylene di-isocyanate (HMDI) with ratios of 0.75, 1.0 and 1.25 were added to a Brabender melt mixing equipment. Samples were taken at 1, 2, 5, 10 and 15 minutes. Results are presented in FIG. 2. Solution coated films on Performa White board displayed OTRs of 83, 92 and 83 $cm^3/m^2$ day for HMDI:prepolymers ratios of 0.75, 1.0 and 1.25, respectively

TABLE 1

Prepolymer properties

| | Mn (NMR) g/mol | Mn (GPC) g/mol | Mw (GPC) g/mol | Tg ° C. | Tc ° C. | ΔHc J/g | Tm ° C. | ΔHm J/g |
|---|---|---|---|---|---|---|---|---|
| Example 1. | 2000 | 10800 | 15000 | 24 | 90 | 15 | 209 | −99 |
| Example 2. | 1500 | 10000 | 14400 | 19 | 95 | 51 | 203 | −95 |
| Example 3. | 1300 | 10300 | 14400 | 14 | 88 | 47 | 196 | −97 |
| Example 4. | 3800 | 14700 | 26900 | 36 | — | — | 212 | −87 |
| Example 5. | 1300 | 10400 | 14200 | 33 | 103 | 42 | 210 | −98 |
| Example 6. | 1800 | 13100 | 13400 | 24 | 91 | 36 | 208 | −98 |
| Example 7. | 1500 | 13900 | 16000 | 32 | — | — | 190 | −21 |

Example 13

Figure 3:
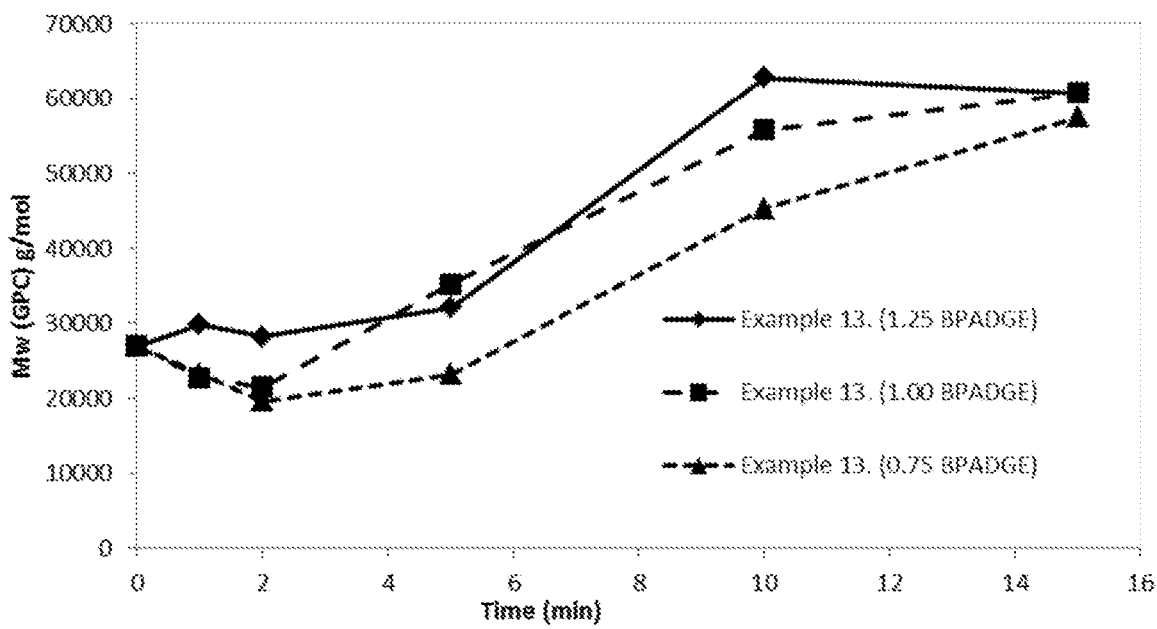
FIG. 3 shows the molecular weight increase of polymers when a bisepoxy functional compound is used as in Example 13.

55 g of prepolymer prepared in Example 1 and bisphenol A diglycidyl ether (BPADGE) with ratios of 0.75, 1.0 and 1.25 were added to a Brabender melt mixing equipment. Samples were taken at 1, 2, 5, 10 and 15 minutes. Results are presented in FIG. 3. Solution coated films on Performa White board displayed OTRs of 226 cm$^3$/m$^2$ day.

Example 14

Glycolic acid (100 kg), and hexanediol (2 mol-%) were added to a multipurpose reactor at 25-70° C. over a period of 2 h. Then, Sn(Oct)$_2$ (0.05 m-%) was added to the molten mixture of glycolic acid and hexane diol, and the melt condensation reaction was performed. Temperature was increased gradually during the reaction and the pressure was reduced slowly to <50 mbar. To prevent formation of glycolide such an incremental process was chosen. After completing the reaction, the polymer (76 kg, ~100% yield) was placed in metal containers, allowed to cooled to room temperature. During cooling the material crystallized, and to obtained solid was ground to a coarse powder through a sieve (Ø4 mm).

The coarse polymer powder was then placed into a 100 L Lödige reactor. The reaction was continued in solid state by sequentially increasing the temperature from ~25 C to ~120 C and then ~160 C. During this reaction step, the polymer was held under constant, reduced pressure. Yield 63 kg, M$_n$ (NMR) 2 800 g/mol, M$_n$ (GPC) 8 700 g/mol, M$_w$ (GPC) 17 500 g/mol, T$_g$ 27° C., T$_c$-, ΔH$_c$-, T$_m$ 210° C., ΔH$_m$-84 J/g, 100% OH-terminated.

Example 15

The step growth polymerization of the PGA polymer prepared in example 14 and hexamethylenediisocyanate was carried out in a twin screw extruder. Prior to the reaction the polymer was dried overnight in 120° C. and allowed to cool to room temperature under reduced pressure to minimize excess moisture. The PGA prepolymer was fed to an extruder at 3 kg/h. The hopper used was continuously purged with dry N$_2$. A pump was used to dose hexamethylene di-isocyanate to the extruder at molar rate of 0.9× compared to PGA. The product was collected on a cooled conveyer belt and collected. In this was a polymer with Mn (GPC) 51 300 g/mol, Mw (GPC) 211 400 g/mol, Tg 30° C., Tc-, ΔHc-, Tm 205° C., ΔHm-48 J/g, modulus 8.5 GPa, tensile stress at yield 72.1 MPa, and tensile strain at break 3.1% was obtained.

Example 16

Example 15 was repeated by dosing hexamethylene di-isocyanate to the extruder at molar rate of 1.0× compared to PGA. Following polymer was obtained: Mn (GPC) 47 500 g/mol, Mw (GPC) 245 900 g/mol, Tg 31° C., Tc-, ΔHc-, Tm 191° C., ΔHm-58 J/g, Modulus 6.4 GPa, Tensile stress at yield 80.4 MPa, Tensile strain at break >100%.

Example 17

Example 15 was repeated by dosing hexamethylene di-isocyanate to the extruder at molar rate of 1.05× compared to PGA. Following polymer was obtained: Mn (GPC) 52 300 g/mol, Mw (GPC) 202 700 g/mol, Tg 32° C., Tc-, ΔHc-, Tm 206° C., ΔHm-63 J/g, Modulus 7.1 GPa, Tensile stress at yield 78.6 MPa, Tensile strain at break >100%.

Example 18

Example 15 was repeated by dosing hexamethylene di-isocyanate to the extruder at molar rate of 1.15× compared to PGA. Following polymer was obtained: Mn (GPC) 45 500 g/mol, Mw (GPC) 203 600 g/mol, Tg 31° C., Tc-, ΔHc-, Tm 204° C., ΔHm-60 J/g, Modulus 6.5 GPa, Tensile stress at yield 74.0 MPa, Tensile strain at break >100%.

TABLE 2

Properties of extrusion products

| | $M_n$ (GPC) [g/mol] | $M_w$ (GPC) [g/mol] | $T_g$ [° C.] | Modulus [GPa] | Tensile stress at Yield [MPa] | Tensile strain at Break [%] |
|---|---|---|---|---|---|---|
| Example 15. | 51300 | 211400 | 30 | 8.5 | 72.1 | 3.1 |
| Example 16. | 47500 | 245900 | 31 | 6.4 | 80.4 | >100 |
| Example 17. | 52300 | 202700 | 32 | 7.1 | 78.6 | >100 |
| Example 18. | 45500 | 203600 | 31 | 6.5 | 74.0 | >100 |

Example 19

Copolymerization of glycolic acid and hexanediol was carried out in a similar fashion as described in Example 7. The obtained polymer was then copolymerized with 1,6-hexamethylene diisocyanate in a twin screw extruder. The molar ratio between the prepolymer and the diisocyanate was 1:1.

Standard mechanical test specimens were prepared by injection molding and the resultant polymer exhibited the following mechanical properties:

Tensile strength: 78 MPa
Tensile modulus: 7.5 GPa
Elongation: >100%

The present high-molecular weight aliphatic polyesters exhibit decreased discoloration, good heat and chemical resistance as well as good gas barrier properties, e.g. excellent oxygen and carbon dioxide barrier properties, and can be used alone or as composite materials or multi-layered structures in a wide variety of fields as extruded, compression-moulded, injection-moulded, blow-moulded products, and other formed or moulded products.

Further, the polymers prepared herein can be extruded to threads, spun to fibers or with suitable additives extruded to foams. A particular, but not an exclusive list of examples, is the following: multilayer films obtained after extrusion optionally combined with a subsequent blowing or biaxial orientation process for packaging applications, laminated optionally multi-layered films for packaging applications, injection molded articles for use in oil or gas drilling, injection molded articles for various parts or consumer articles, injection molded articles for use in degradable implants in bone repair, foamed products for insulation of sound or against temperature, spun fibers for cloths, textiles and sutures.

The instant polymers can be used for coating of specimens, preferably specimens selected from the group of solid objects and webs, in particular by thermal powder coating or extrusion coating.

The process may also be optimized for reactive extrusion in such way that the above products be directly produced after the described step-growth polymerization process.

Based on the above, it is possible to prepare materials which have high modulus imparting in improved rigidity of the material and may permit reduction of materials in multilayer structures, which contributes to cost saving and environmental benefits, which structures have high elongation useful in biaxial orientation or thermoforming applications yielding layers that are not prone to exhibit discontinuities; and which materials have high optical clarity in transparent films.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A glycolic acid polymer obtained by a process comprising the steps of
    a) producing a telechelic pre-polymer having a degree of crystallinity of at least 40% by the steps comprising:
        providing glycolic acid;
        providing a difunctional monomer selected from the group consisting of diols, dicarboxylic acids, and dicarboxylic acid anhydrides;
        subjecting said glycolic acid to polymerization in the presence of a catalyst and said difunctional monomer; and
        continuing polymerization to provide a polymeric chain having a degree of crystallinity of at least 40% formed by residues derived from glycolic acid and said difunctional monomer;
        wherein the weight ratio of the glycolic acid to the total weight of glycolic acid and difunctional monomer is more than 95%; wherein production of the telechelic pre-polymer is carried out in an initial solid state at 200° C. or less under reduced pressure, and
    b) subjecting said telechelic pre-polymer to step growth polymerization in the presence of a compound selected from diisocyanates, bisepoxy compounds, dialdehydes, diketenes, phosphoric acid derivatives, and bisoxazolines, wherein the step growth polymerization step is completed in less than 30 minutes.

2. The polymer according to claim 1, wherein the polymerization of glycolic acid and the difunctional monomer, optionally in combination with a dehydration step, is continued until a polymer comprising 10 to 50 residues of glycolic acid is obtained.

3. The polymer according to claim 1 wherein the molar ratio of glycolic acid and difunctional monomer in the telechelic pre-polymer is between 48:1 and 53:1.4.

4. The polymer according to claim 1, wherein the temperature of the polymerisation of glycolic acid and the difunctional monomer is gradually increased and the absolute pressure decreased.

5. The polymer according to claim 1, wherein the polymerisation of glycolic acid and the difunctional monomer is carried out in the presence of a catalyst selected from the group of zinc, tin or titanium octoate.

6. The polymer according to claim 1, wherein the polymerization of glycolic acid and the difunctional monomer is continued to provide an essentially linear hydroxy-terminated polymeric chain.

7. The polymer according to claim 6 wherein the polymer has a molecular weight (Mn) of from 20,000 to 1,000,000 g/mol.

8. The polymer according to claim 1 wherein ratio between the telechelic pre-polymer and the comonomer is between 1:0.9 to 1:1.3.

9. The polymer according to claim 1 wherein the step growth polymerization is carried out at a temperature of 220-240° C.

10. The polymer according to claim 1 wherein the comonomer is selected from a diisocyanate and a diepoxide.

11. The polymer according to claim 10 wherein the comonomer is hexamethylene diisocyanate.

12. The polymer according to claim 1 wherein the step growth polymerization step is completed in less than 10 minutes.

* * * * *